May 2, 1933.  L. DEVOL  1,906,250

ELECTRIC FILTERING APPARATUS

Filed Nov. 18, 1931  2 Sheets-Sheet 1

INVENTOR
Lee Devol,
BY
His ATTORNEY

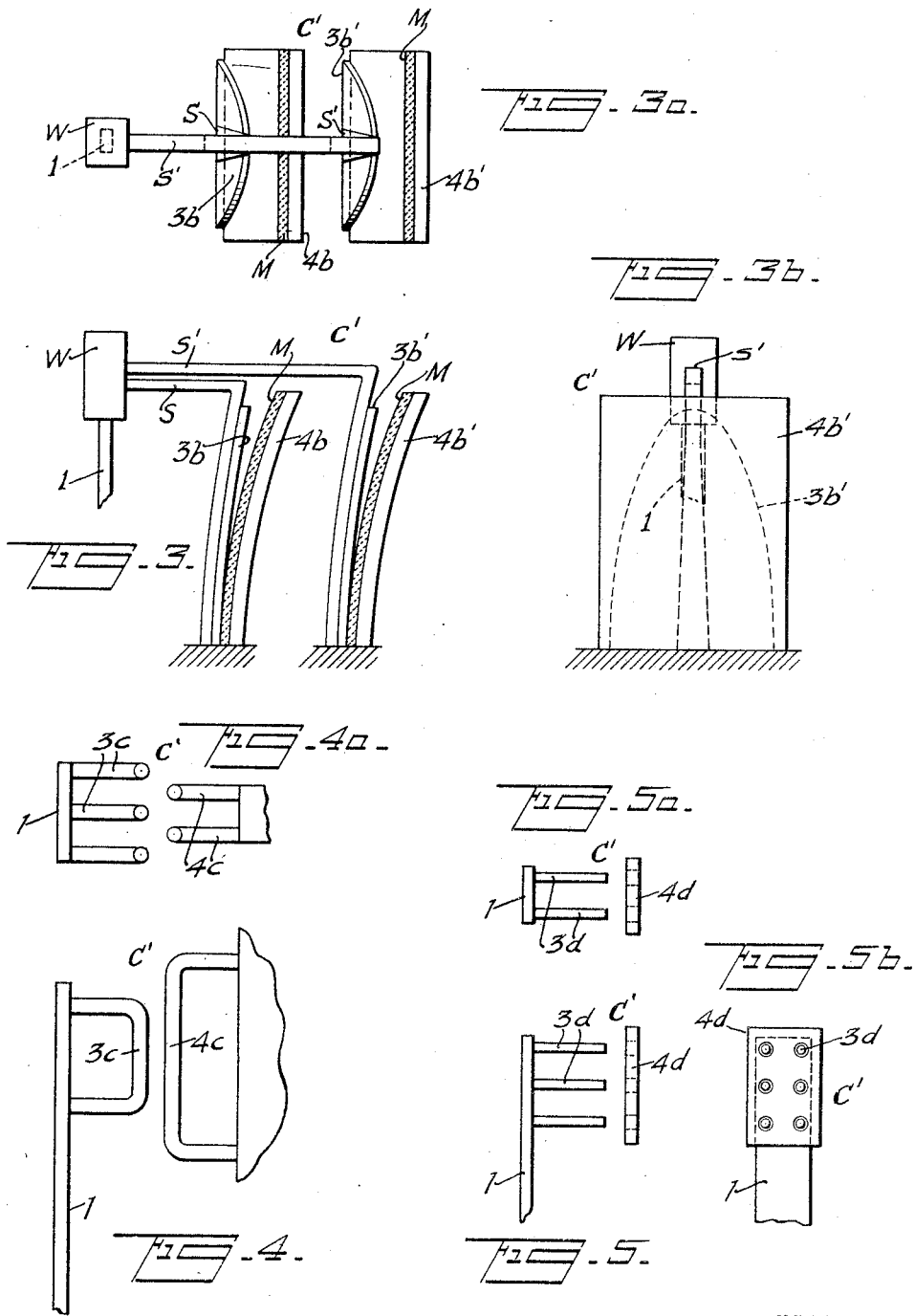

Patented May 2, 1933

1,906,250

UNITED STATES PATENT OFFICE

LEE DEVOL, OF FOREST HILLS, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRIC FILTERING APPARATUS

Application filed November 18, 1931. Serial No. 575,817.

My present invention comprises a filtering unit suitable for feeding devices requiring small operating current and particularly adapted for sharp tuning at relatively low frequencies. More specifically the invention comprises a filtering unit having a mechanically tuned member, such as a reed, so associated with an electrically tuned circuit as to operate conjointly therewith in the transmission of frequencies of the order of those at which the member will vibrate, thus utilizing the sharper tuning ability of mechanically tuned instruments as compared with electromagnetically tuned circuits at low frequencies. The new unit may be so constructed as to yield an output current having any one of a wide variety of wave forms, including, as a special case, a pure sine wave.

Figure 1:
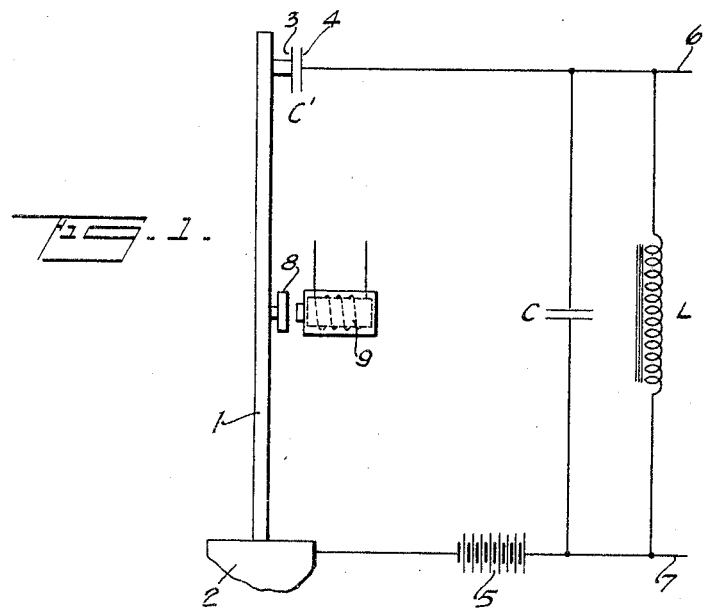
Figures 2, 2A:
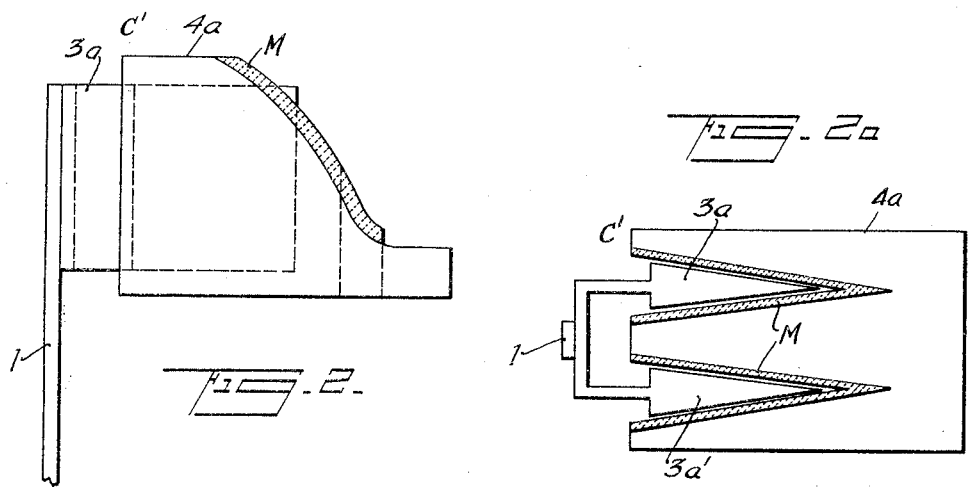

For an understanding of the invention reference may be had to the accompanying drawings of which Fig. 1 is a diagrammatic view of the new filtering unit explanatory of the principle upon which the unit functions. Figs. 2 and 2a are side and plan views respectively of a form of condenser or power generator for the unit of Fig. 1 which is suitable for use when the output current is to be a pure sine wave. Fig. 3 is a side view of another and preferred form of condenser or power generator for yielding a pure sine wave. Figs. 3a and 3b are plan and front views respectively of the device of Fig. 3 and Figs. 4 and 4a, 5, 5a and 5b are views of other possible forms of condensers for use in the unit of Fig. 1.

The new unit, as indicated in Fig. 1, comprises a mechanically vibrating member, in this instance a reed 1, mounted at one end in any suitable fixed support 2 and carrying at its free end one plate 3 of a condenser C'. Plate 4 of condenser C' is fixed and is connected through a parallel tuned circuit comprising a capacity C and inductance L with one terminal of a source of direct voltage, indicated as a battery 5, to the other terminal of which base 2 is connected. Condenser C and inductance L are so chosen with relation to the natural period of the reed as to cause the parallel circuit to be in resonance at the frequency to which the reed responds. With this arrangement when reed 1 is stationary, the potential difference of battery 5 is impressed across the plates 3 and 4 of condenser C' and no current flows through the circuit. If, however, reed 1 is vibrated, plate 3 moves alternately toward and from plate 4, changing cyclically the capacity of condenser C', and, as a result, the potential thereacross, causing an alternating current to flow in the filter circuit. A small amount of power can be taken from the unit and delivered to any suitable output circuit connected, for example, by wires 6 and 7 across the parallel tuned circuit. Any suitable means may be provided for vibrating reed 1. For example, an armature 8 may be mounted on the reed in position to be periodically attracted toward an electromagnet 9 to the windings of which alternating current may be supplied. When the frequency of the input current is that corresponding to the natural period of the reed and to which capacity C and inductance L are tuned, maximum output current will be delivered by the unit. At any other frequency the impedance of the parallel tuned circuit will decrease with consequent reduction in available power in the output circuit.

The size and construction of condenser C' which acts as the power generator of the unit, are both of importance. As the maximum power output of the unit occurs when the impedance of the output circuit is equal to the impedance of the power generator, in this case the reactance of the condenser C', it is important when the unit is to be used to feed a vacuum tube at low frequencies, that the capacity of condenser C' be made as large as possible for but one megohm or less can in many cases be assumed for the impedance of the tube. Furthermore, as the wave form of the output current depends upon the variation of capacity of condenser C' with reed deflection, it follows that in order to make the wave form of the output current a pure sine wave, the shapes of plates 3 and 4, when the motion of reed 1 is simple harmonic, as it must be for best selectivity of the filter, must be so chosen that a linear relation exists between displacement of plate 3 and the capacity of condenser C'.

In Figs. 2, 2a, 3, 3a and 3b condensers are illustrated which may have the large capacity required when the unit is to be used to feed at low frequencies a vacuum tube or other output device of similar impedance, and which have plates so shaped as to give a pure sine wave output current. In Figs. 2 and 2a, the movable member 3a of the condenser C' comprises two triangular prisms which, upon vibration of reed 1, move into and out of wedge-shaped openings in a block 4a, serving as the stationary plate of the condenser. The dielectric strength and the capacity of the condenser are increased by a layer M of mica or the like dielectric material fastened to the surface of the wedge-shaped openings of block 4a. Block 4a is so cut away (see Fig. 2a) as to cause the effective area of the condenser to be gradually decreased as prisms 3a move into the openings of block 4a. This superposes on the normal increase of capacity with displacement, a decrease in effective area, which, with proper shaping of the cut-away portion of the block 4a, can be made just sufficient to cause a linear relationship between reed displacement and capacity with consequent pure sine wave form for the output current.

In Figs. 3, 3a and 3b, a particularly advantageous form of condenser C' is combined with a tuning weight W carried by the reed 1. The movable plates 3b and 3b' of condenser C' are in the form of flexible metal sheets mounted on a pair of springs S and S' so as to bend therewith. One end of each of springs S and S' is fixed and the other end of each is fastened to the tuning weight W on reed 1 so as to be moved with vibration of the reed. Stationary plates 4b and 4b' carrying a layer of dielectric material M are positioned so as to have increasing proportions of the surfaces of sheets 3b and 3b' engage material M as the displacement of the reed increases. In order to give a pure sine wave, plates 3b and 3b' are tapered toward their upper end, as shown in Fig. 3b.

As has been mentioned heretofore, the vibration of the reed should be simple harmonic for best selectivity of the filter. Ordinarily, if the reed is vibrated by periodic attraction toward a pole piece, such as indicated by the electromagnet of Fig. 1, when the reed approaches close to the pole piece the force exerted thereby increases more rapidly than the displacement. This may be overcome by maintaining a sufficient gap between the pole piece and the armature or equivalent portion of the reed but only with loss of available power and lack of economy of dimensions. This may be more efficiently overcome, however, by the use of the condenser illustrated in Figs. 3, 3a and 3b in which the springs S and S' and blocks 4b and 4b' are so shaped as to provide a force tending to return the reed to neutral position and of such a value that when superposed upon the force exerted by the pole piece result in impressing simple harmonic motion upon the reed.

In Figs. 4 and 4a is illustrated a form of condenser C' having movable plates or tubes 3c, and stationary plates or tubes 4c, so shaped as to cause the capacity to reach a maximum value for a given reed displacement and then to fall off as the displacement increases. This condenser provides an approximately constant power output independent of amplitude when the amplitude is sufficient to move the vertical parts of plates 3c beyond the vertical parts of plates 4c. Also, the output frequency is double the input frequency because there are two output pulses in opposite directions for each cycle of vibration of the reed, one when plates 3c enter plates 4c, and one when they leave. The constant power output may be taken advantage of to prevent troubles which would arise from overloading of the apparatus fed by the filter, and the double frequency output will result in reduced size of transformers, reactors, etc., which may be fed by the filter.

In Figs. 5, 5a and 5b is illustrated a form of condenser C' having movable rods 3d and a stationary plate 4d so shaped as to cause the capacity to increase rapidly with the displacement and then remain constant after passage of the ends of rods 3d through apertures in plate 4d. This device has the same advantages and features as the device shown in Figs. 4 and 4a.

The new filtering unit has now been described and various possible forms of the condenser or power generator thereof have been indicated. The particular form of condenser chosen and the size thereof depend, of course, upon the wave form of output current desired and upon the impedance of the output circuit to which the filter is to deliver current. Unless the condenser is so chosen that the output current has the form of a pure sine wave the form of output current will vary with the shape of condenser elements and with the amplitude of vibration of the mechanically tuned member of the device. It will be apparent that the frequency of the output current could be made twice that of the input and the maximum output of the unit doubled by mounting movable plates of similar condensers on both sides instead of on one side of the mechanically vibrating member. Instead of a reed, any other suitable mechanically vibrating device could be employed and the vibration thereof could be torsional, longitudinal or transverse, without departing from the spirit of the invention. Although in the preferred form of the invention the mechanically tuned member is combined with an electrical circuit tuned to the same frequency, such tuned circuit is not essential, as a resistor could be substituted therefor when the condenser is large enough to supply sufficient power thereacross.

The following is claimed:

1. A filter unit comprising in combination a mechanically vibrated member, a condenser having one fixed and one movable element, said movable element being so moved by said member as to vary the capacity of said condenser cyclically with vibration of said member, and a circuit including a source of constant potential connected across said condenser whereby said condenser operates as a power generator of current having the frequency at which said member vibrates wherein one of the elements of said condenser being of such a shape as to so decrease the effective area of the condenser with decrease of the distance between the elements thereof as to vary the capacity of the condenser linearly with the displacement of said member whereby, if the motion of said member is simple harmonic, the current generated by said condenser will have the form of a pure sine wave.

2. A filter unit according to claim 1 wherein electromagnetic means are provided for causing vibration of said member and wherein spring means are associated with said member for adding a restoring force thereto so varying with the displacement of said member as to cause said member to vibrate under the influence of said electromagnetic means and said spring means with simple harmonic motion.

3. A filter unit according to claim 1, wherein electromagnetic means are provided for causing vibration of said member and wherein said member carries a tuning weight to which is attached one end of a spring, the other end of which is fixed, the movable element of said condenser being carried by said spring and the stationary element of said condenser carrying a layer of dielectric material and being so positioned relative to the movable element as to cause said spring to apply a restoring force to said member so varying with the displacement thereof as to cause said member to vibrate under the influence of said restoring force and of said electromagnetic means with simple harmonic motion.

4. A filter unit including in combination a mechanically vibrated member, a condenser having fixed and movable elements; the movable elements thereof being carried by said member so as to vary the capacity of said condenser cyclically with vibration of said member, and a circuit including a source of constant potential connected across said condenser, the elements of said condenser being so shaped as to cause the wave form of the current generated in said circuit by said condenser during vibration of said member to vary with the amplitude of vibration of said member.

5. A filter unit according to claim 4 wherein said elements are so shaped as to cause the capacity of said condenser to increase to a maximum value with increase in displacement of said member and to thereafter remain constant with further increase in displacement of said member.

6. A filter unit according to claim 4 wherein said elements are so shaped as to cause the capacity of said condenser to first increase and then decrease with increasing displacement of said member.

7. A filter unit comprising in combination a mechanically vibrated member, a condenser having one fixed and one movable element, said movable element being so moved by said member as to vary the capacity of said condenser cyclically with vibration of said member, and a circuit including a source of constant potential connected across said condenser and including elements tuned for parallel resonance at the natural frequency of said member whereby said condenser operates as a power generator of current having the frequency at which said member vibrates and the potential across said tuned elements is a maximum when said member vibrates at its natural frequency.

In testimony whereof I affix my signature.

LEE DEVOL.